United States Patent [19]

Vidal et al.

[11] Patent Number: 4,624,281
[45] Date of Patent: Nov. 25, 1986

[54] CONTROL VALVE

[75] Inventors: Jean E. Vidal, Enghien; André L. Sério, Meudon, both of France

[73] Assignee: Compagnie Francaise des Petroles, Paris, France

[21] Appl. No.: 697,366

[22] Filed: Feb. 1, 1985

[30] Foreign Application Priority Data

Feb. 3, 1984 [FR] France ............................ 84 01658

[51] Int. Cl.⁴ .................................... F16K 11/12
[52] U.S. Cl. .......................... 137/599.2; 137/315; 137/614.17; 251/315
[58] Field of Search ............. 137/599.2, 637.5, 614.17, 137/269.5, 315; 251/315

[56] References Cited

U.S. PATENT DOCUMENTS

| 2,880,748 | 4/1959 | Elsey ........................ 137/614.17 X |
| 3,272,473 | 9/1966 | Veit et al. .................... 251/315 X |
| 3,854,497 | 12/1974 | Rosenberg .................. 137/269.5 X |
| 4,114,639 | 9/1978 | Cross et al. .................. 251/315 X |
| 4,187,872 | 2/1980 | Freeman et al. ............. 137/599.2 X |
| 4,502,663 | 3/1985 | Huber ........................... 251/315 X |

FOREIGN PATENT DOCUMENTS 4635308 10/1971 Japan .............................. 137/599.2

Primary Examiner—Martin P. Schwadron
Assistant Examiner—Stephen M. Hepperle
Attorney, Agent, or Firm—Sughrue, Mion, Zinn, Macpeak and Seas

[57] ABSTRACT

A control valve comprises a body having a fluid inlet and a fluid outlet and a rotary member provided with two separate internal passages, each capable of connecting the fluid inlet to the fluid outlet, according to the angular position of the rotary member in the said body. A control system is arranged in one of the passages for controlling fluid along the passage independent of the angular position of the rotary member, while the control of flow of fluid in the other passage is effected by adjustment of the angular position of the rotary member. The one passage is the main passage for normal use and the other passage is a secondary or by-pass passage for use when work is required to be done on the control system in the one passage. The control system in the one passage comprises valve members operated by a rod for closing seats in the passage.

4 Claims, 8 Drawing Figures

CONTROL VALVE

BACKGROUND OF THE INVENTION

The present invention relates to a control valve and more particularly to a control valve for an installation in which it is important to be able to ensure continuous operation, as is the case particularly in oil production, in refining or generally in the chemical industry.

In such an installation, when a fluid flow or pressure is to be controlled by means of a control valve, the latter is usually fitted in series with an isolation valve upstream and an isolation valve downstream, and a bypass line equipped with a manually-controlled auxiliary control valve is placed between the ends of these three valves.

Thus, when action needs to be taken for repair of the main control valve, the two isolation valves are closed and the control is carried out manually with the aid of the auxiliary control valve during the servicing period.

This results in a control valve assembly which is very heavy, very bulky and very costly.

SUMMARY OF THE INVENTION

According to the invention it is proposed to incorporate in a rotary member of a valve, simultaneously, a main line with a seat and control system operable independently of the angular position of the rotary member, and a bypass line, the change from one line to the other being made by rotation of the rotary member and the control of the bypass line being effectd by adjustment of the angular position of the rotary member.

According to the present invention there is provided a control valve comprising a body providing an axial fluid inlet line and an axial fluid outlet line and a fluid connection between said lines through at least one seat and at least one closure member, for controllable closing of said seat, and movable by means of an operating rod projecting from said body along a rod direction perpendicular to the axial direction of said inlet and outlet lines, wherein the valve body contains a rotary member rotatable around an axis of rotation oriented along said rod direction, and in which are provided: a central hole oriented along the axis of rotation, provided with said seat and permitting passage of said operating rod and of said closing member, a main inlet orifice and a main outlet orifice which are diametrically opposed along a first diameter perpendicular to said axis of rotation, a main inner passage for connection between said main inlet and main outlet orifices and including said seat, an auxiliary inlet orifice and an auxiliary outlet orifice which are diametrically opposed along a second diameter perpendicular to said axis of rotation, and an auxiliary inner passage for connection between said auxiliary inlet and auxiliary outlet orifices, the arrangement being such that, in a first angular position of said rotary member, said main inlet and main outlet orifices are respectively opposite said fluid inlet and fluid outlet lines, control being effected by means of said operating rod, and such that, in a second angular position of said rotary member, said auxiliary inlet and auxiliary outlet orifices are respectively opposite said fluid inlet and fluid outlet lines, control being effected by adjustment of said second angular position of said rotary member.

Preferably the valve body carries, around each of the axial inlet and outlet lines, two leakproofing seals separated from each other and applied against the rotary member to ensure leakproofing between the fluid stream and the inside of the body in all positions of the rotary member.

Where the rotary member is spherical, the valve body may carry, around each of the axial inlet and outlet lines, a first annular seal with a means circumference slightly greater than the circumference of the respective main orifice and a second annular seal with a means circumference greater than the mean circumference of the first annular seal, the two seals being coaxial with the axial inlet and outlet lines and being applied resiliently against the spherical rotary member, the outer circumference of the rotary member intersected by the plane of said first and second diameters forming a segment included between the mean circumference of the first seal and the means circumference of the second seal which is at least as long as the segment out by any one of the main or auxiliary inlet or outlet orifices.

BRIEF DESCRIPTION OF THE DRAWINGS

Other features of the invention will become apparent from the following description of an embodiment thereof given by way of example only with reference to the accompanying drawings.

In the drawings.

DETAILED DESCRIPTION OF THE PREFERRED EMBODIMENTS

Figure 1:
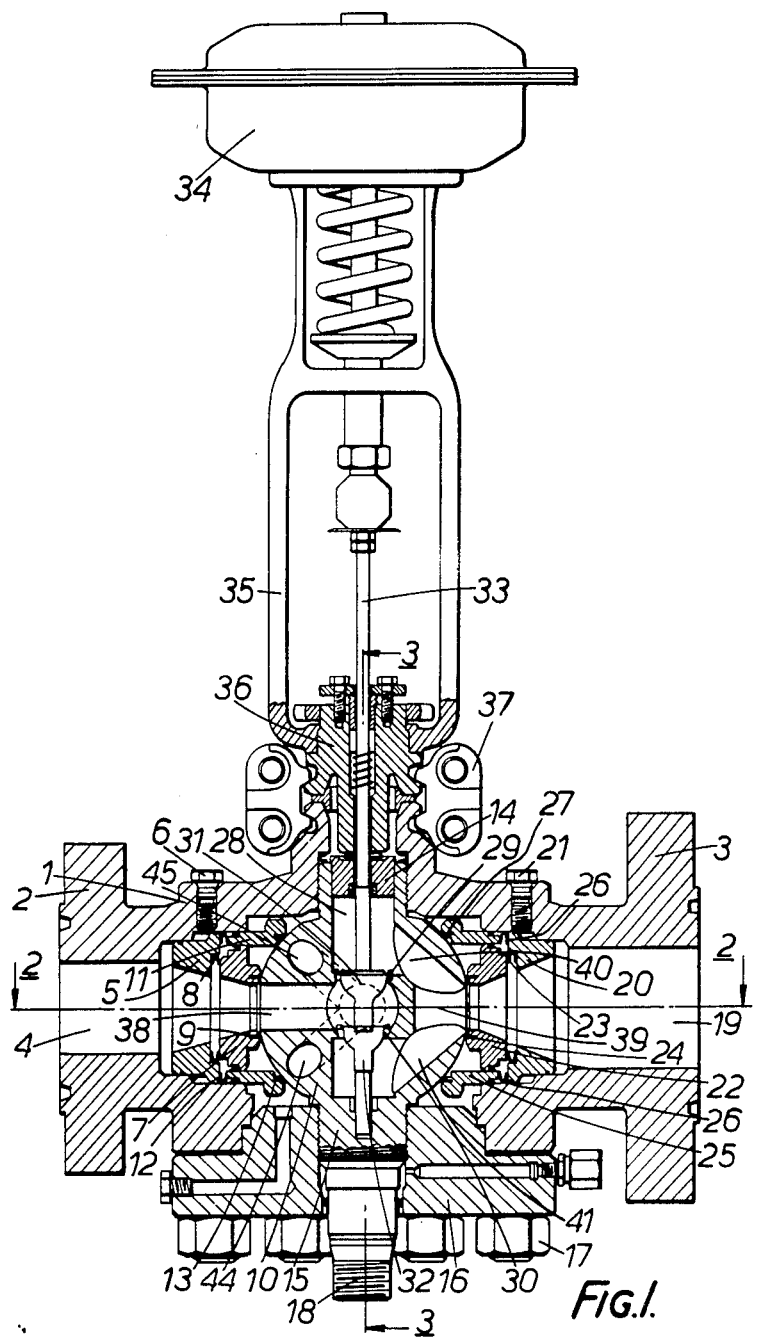
FIG. 1 is an axial section through an embodiment of a control valve according to the invention.

In FIG. 1, a valve body 1 is provided, at its axial ends, with two flanges 2, 3 for connection to the line sections (not shown). The axis of the flanges 2 and 3 has been arranged horizontally as shown. An axial line or passage, for example for fluid inlet, is formed on the left of FIG. 1 by the inner bore 4 of the flange 2 and by the frustoconical internal surfaces, converging towards the centre of the valve body, of a stop ring 5 held in the body 1 by three locking screws 6 and a contact ring 7 biassed to the right by a resilient member 8, such as a Belleville washer, inserted between the rings 5 and 7. At its right end, ring 7 carries an annular leakproofing seal 9 which is applied against a sphericl rotary member 10. Another contact ring 11, biassed by a resilient member 12, such as a Belleville washer, inserted between the rings 5 and 11, is also applied against the spherical rotary member 10 by an annular leakproofing seal 13. Leakproofing seals are provided between ring 5 and the body 1, between ring 7 and ring 11 and between the ring 11 and the body 1.

The spherical rotary member 10 is provided with two journals 14 and 15 which are vertical as shown and can rotate in cylindrical housings provided respectively in the body 1 and in a removable lower cover 16 fixed to the body 1 by nuts 17. Journal 15 is extended downwardly by a splined control shank 18 which projects outside the cover 16. This shank 18 can be operated either manually by means of a simple key or with a geared tool, or by a motor.

An axial line or passage, for example for fluid outlet, is formed on the right of FIG. 1 by the inner bore 19 of the flange 3 and by the frustoconical internal surfaces, converging towards the centre of the valve body, of a stop ring 20 held in the body 1 by three locking screws 21 and a contact ring 22 biassed to the left by a resilient member 23, such as a Belleville washer, inserted between the rings 20 and 22. Ring 22 carries, at its left end, an annular leakproofing seal 24 which is applied against the spherical rotary member 10. Another contact ring 25, biassed by a resilient member 26, such as a Belleville washer, inserted between rings 25 and 20, is also applied against the spherical rotary member 10 by an annular leakproofing seal 27. Leakproofing seals are provided between ring 20 and the body 1, between the ring 22 and the ring 25 and between the ring 25 and the body 1.

In the embodiment shown, in the horizontal diameter plane of the rotary member, a seal 9 or 24 subtends a circular arc which is approximately one third of the circular arc subtended by a seal 13 or 27 and this latter circular arc represents approximately a quarter of a circumference.

A hole 28 perpendicular to the axis of bores 4, 19 and as shown vertical is provided in the spherical rotary member 10 and two seats 29 and 30 are arranged therein. Seats 29 and 30 are partly or totally closable, respectively, by two mushroom valves 31 and 32 carried by a rod 33. The rod 33, guided by a sleeve in the hole 28, may be operated by a servo motor 34, the base 35 of which is fixed by a connecting sleeve 36 and a "GRAYLOC" coupling 37, manufactured by the Gray Tool Company, to the valve body 1. The seats 29 and 30 are arranged in two parallel branches of a hydraulic connection provided between a radial cylindrical orifice or main inlet 38 and a radial cylindrical orifice or main outlet 39, which are diametrically opposed. Orifice 38 opens directly into the hole 28, in the centre of the spherical rotary member 10 between the two mushroom valve seats 29 and 30. Passages 40 and 41 provide, respectively, communication between the upper part of the hole 28 situated above the mushroom valve seat 29, and the lower part of the hole 28 situated below the mushroom valve seat 30, and the orifice 39.

Figure 2:
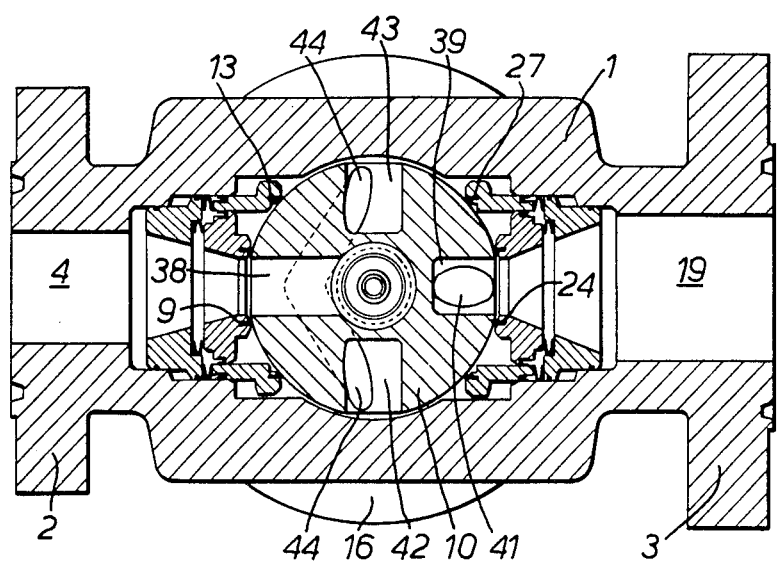
FIG. 2 is a section on the line 2—2 of FIG. 1.
Figure 3:
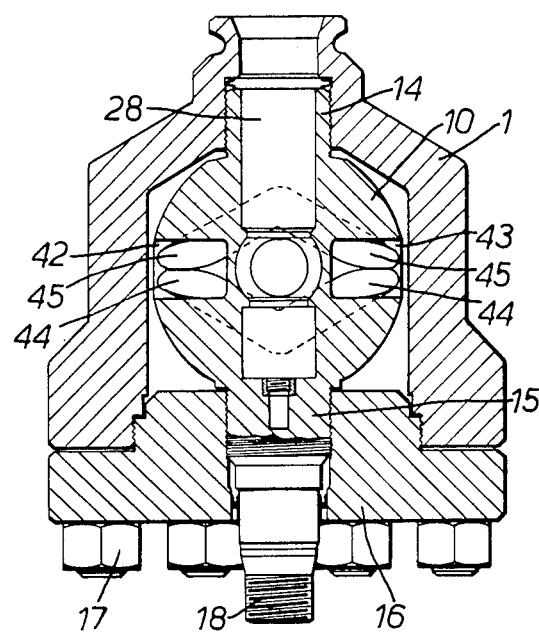
FIG. 3 is a section through part of the valve on the line 3—3 of FIG. 1.

When the rotary member 10 is in the position shown in FIGS. 1, 2 and 3, orifice 38 is opposite the inlet line and orifice 39 is opposite the outlet line. When the mushroom valves 31 and 32 are raised, the fluid arriving in the bore 4 and flowing in the orifice 38 and the central part of the hole 28 is divided into an upper stream which passes through seat 29 and arrives in orifice 39 through passage 40, and a lower stream which passes through seat 30 and arrives in orifice 39 through passage 41. Both streams then recombine in orifice 39 and leave through the bore 19. Control is carried out by altering the position of the mushroom valves 31 and 32 by means of the servo motor 34. The valves 31 and 32 are moved by translation or rotation of the rod or by a combination of translation and rotation of the rod.

From FIGS. 2 and 3 it can be seen that, perpendicularly to the orifices 38 and 39 and horizontally, two radial, diametrically opposed cylindrical auxiliary orifices 42 and 43 are provided in the rotary member 10. These orifices 42 and 43 are connected together by two elbow channels 44, 45 arranged in parallel and each formed by two straight passages. Channel 44 is hollowed out in the lower part of the spherical rotary member 10, and channel 45 is hollowed out in the upper part of the spherical rotary member 10. In FIG. 1 it can be seen that these two channels 44 and 45 are hollowed out in the left hemisphere of the spherical rotary member 10, while the passages 40 and 41 have been made in the right hemisphere of the rotary member 10.

When the rotary member 10 is turned clockwise with reference to FIG. 2, it can be seen that firstly the inlet line is closed by application of seal 9 against a solid part of the spherical rotary member 10. Then, orifice 42 reaches seal 9 and orifice 43 reaches seal 24. Fluid then flows from bore 4 to bore 19 through orifice 42, channels 44 and 45 and orifice 43. Control can then be carried out by altering the angular position of the spherical rotary member 10. when the spherical rotary member 10 has undergone a rotation through 90° from its initial position, the valve is fully open to its bypass line. Preferably, the same flow cross-section is provided in the auxiliary orifices 42 and 43 as in the main orifices 38 and 39 and in the channels 44 and 45 as in the passages 40 and 41.

As soon as the spherical rotary member 10 has undergone a rotation which is sufficient for orifices 38 and 39 to have left the leakproofing seals 9 and 13 on the left, and 24 and 27 on the right, hole 28 is hydraulically isolated and it is possible to disassemble the coupling 37 and to withdraw the mushroom valves 31 and 32, for example to replace them and to carry out work on the mushroom valve seats 29 and 30. The parts of the valve which are subject to wear can thus be replaced without interrupting the flow of fluid, the bypass line being very readily substituted for the main line during this operation.

It will be noted that, when the bypass line is used with control, seals 9 and 24 alone are subjected to the flattening effects of the fluid stream. They protect seals 13 and 27 and the latter provide the sealing between the fluid stream and the valve body.

Figure 4:
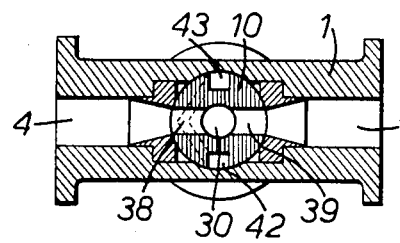
FIGS. 4, 5, 6 and 7 show diagrammatically, on a smaller scale, a section of the valve as shown in FIG. 2, respectively in the case of normal operation, in the case of complete closure, in the case of partial opening via the bypass, and in the case of complete opening via the bypass.
Figure 5:
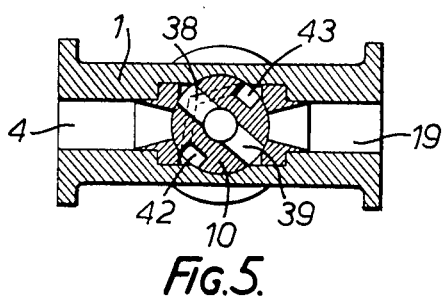
Figure 6:
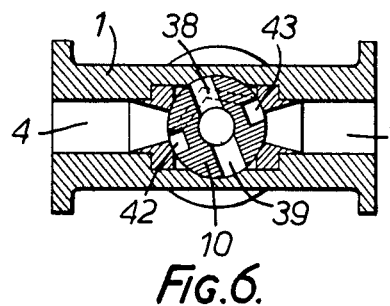
Figure 7:
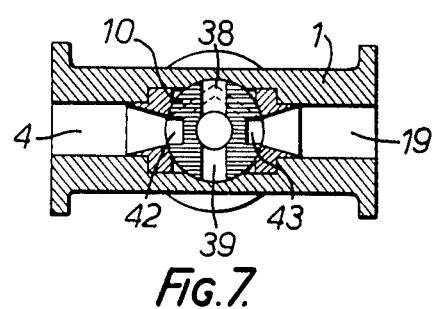

FIGS. 4 to 7 show the circulation of a fluid in the valve for various angular positions of the spherical rotary body 10. FIG. 4 corresponds to normal use of the valve, the control being provided by the mushroom valve system. The position in FIG. 5 is produced by a rotation of the spherical rotary member through one eighth of a turn; the valve is then completely closed both in its mainline and in its bypass line. FIG. 6 corresponds to the start of the controlling position in the bypass line, a position produced after a rotation of the spherical rotary member through three sixteenths of a turn. With a rotation through a quarter turn, full flow is produced in the bypass line as shown in FIG. 7.

Figure 8:
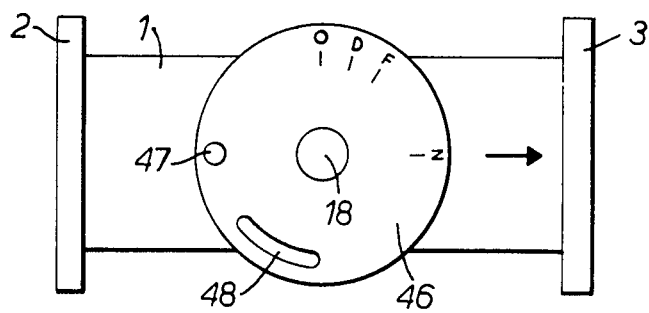
FIG. 8 shows diagrammatically an underneath plan view of the control valve equipped with a plate for indicating the position of the rotary member.

FIG. 8 shows a disc 46 which, being driven in rotation with the operating shank 18, indicates the current position of the valve; the mark N showing the normal operating position, mark F the fully closed position, mark D the position at the start of opening to the bypass line and O the position of full opening via the bypass line.

In addition, it is possible to supplement the valve with notches marking various positions of the rotary member and with devices for locking the spherical rotary member in position. FIG. 8 shows a hole 47 and an aperture 48 in the disc 46. The hole 47 is intended, during the normal operation of the valve, to receive a spring stud carried by the valve body. When a change is to be made to another position of the rotary member, the stud must first be pushed back. The stud then enters the aperture 48 after complete closing of the valve and this aperture permits the change of position from complete closure to the positions for partial or complete opening to the bypass line and vice versa, making an erroneous involuntary reopening operation of the main line impossible.

There is thus provided a single control valve which performs all the functions obtained hitherto by the known assembly of a main valve, two isolation valves, a bypass line and an auxiliary control valve.

What is claimed is:

1. A control valve, comprising: a body (1) defining a fluid inlet line (4) and a fluid outlet line (19) coaxial with said fluid inlet line, and providing a fluid connection between said lines through at least one seat (29, 30); at least one closing member (31,32) for closing said seat; an operating rod (33) projecting from the body for moving said closing member along a rod direction perpendicular to said axial direction of said inlet and outlet lines, a spherical rotary member (10) provided within said body and rotatable around an axis of rotation oriented along said rod direction, said rotary member defining (a) a central hole (28) oriented along said axis of rotation and provided with said seat and permitting the passage of said operating rod and of said closing member, (b) a main inlet orifice (38), (c) a main outlet orifice (39), said main orifices being diametrically opposed along a first diameter perpendicular to said axis of rotation, (d) a main inner passage (40, 41) for connection between said main orifices and including said seat, (e) an auxiliary inlet orifice (42), (f) an auxiliary outlet orifice (43), said auxiliary orifices being diametrically opposed along a second diameter perpendicular to said axis of rotation and defining a common equatorial plane with said first diameter, and (g) an auxiliary inner passage (44, 45) completely separated from the main inner passage for connection between said auxiliary orifices, and, around each of said axial inlet and outlet lines, two leakproofing seals (9, 13; 24, 27) carried by said valve body, separated from each other and applied against said rotary member to ensure leakproofing between a fluid stream and an inside of said body in all positions of said rotary member, one (9,24) of each two leakproofing seals being individually located proximate an associated fluid inlet and fluid outlet line and another (13, 27) of each two leakproofing seals being sufficiently individually spaced from an associated fluid inlet and fluid outlet line so that leakproofing between the fluid stream and the inside of the body is ensured in all positions of the rotary member in which communication is established between one of the fluid inlet and outlet lines and one of the main and auxiliary inlet and outlet orifices, the arrangement being such that, in a first angular position of said rotary member, said main inlet and outlet orifices (38, 39) are respectively opposite said fluid inlet and outlet lines, control being effected by means of said operating rod, and such that, in a second angular position of said rotary member, said auxiliary inlet and outlet orifices (42, 43) are opposite said fluid inlet and outlet lines, control being effected by adjustment of said second angular position of said rotary member.

2. A control valve according to claim 1, wherein each of said one leakproofing seals comprises a first annular seal carried by said body and having a means circumference slightly greater than a circumference of said respective main orifice, and each of said another leakproofing seals comprises a second annular seal carried by said body and having a means circumference greater than said means circumference of said first annular seal, said annular seals being coaxial with said inlet and outlet lines and applied resiliently against said spherical rotary member, an outer circumference of said rotary member intersected by said equatorial plane including said first and second diameters forming a segment included between said mean circumferences of said first and second seals which is at least as long as a diametrical segment subtended by any one of said main or auxiliary orifices.

3. A control valve according to claim 2, wherein said second diameter is perpendicular to said first diameter.

4. A control valve according to claim 3, wherein the flow paths of said main inner passage include said central hole and are disposed in a first hemisphere of said spherical rotary member, said auxiliary inner passage flow paths being provided in a second hemisphere of said spherical rotary member, said hemispheres being defined and separated by a plane passing through said axis of rotation and said second diameter.

* * * * *